United States Patent [19]

Koseki

[11] Patent Number: 4,794,603
[45] Date of Patent: Dec. 27, 1988

[54] POWER SOURCE FOR AN AXIAL-FLOW $CO_2$ LASER TUBE

[75] Inventor: Ryoji Koseki, Buena Park, Calif.

[73] Assignee: Amanda Engineering & Service Co., Inc., La Mirada, Calif.

[21] Appl. No.: 887,957

[22] Filed: Jul. 22, 1986

[51] Int. Cl.$^4$ .............................................. H01S 3/00
[52] U.S. Cl. ......................................... 372/38; 372/81
[58] Field of Search ....................... 372/38, 81, 85, 87, 372/55, 58, 25, 33, 29, 30

[56] References Cited

U.S. PATENT DOCUMENTS 4,017,763  4/1977  Schermesser .......................... 372/38
4,330,762  5/1982  Kaye et al. ............................ 372/38

FOREIGN PATENT DOCUMENTS

0160678  8/1985  Japan ..................................... 372/38

Primary Examiner—William L. Sikes
Assistant Examiner—B. Randolph
Attorney, Agent, or Firm—Wigman & Cohen

[57] ABSTRACT

A power device for an axial-flow-type $CO_2$ laser tube in which a high DC voltage is applied to the cathode side of the laser tube, a ballast resistance is connected to the anode side, and power at a high voltage pulse is applied to this anode side so that laser oscillations occur. In addition, the output of the high voltage pulsed power on the anode side is adjusted by PWM control of the switching circuit, controlling the output of the laser. In this way, the cathodes becomes a common structure, cross discharge is prevented, and the response speed of the power feedback is increased.

20 Claims, 5 Drawing Sheets

POWER SOURCE FOR AN AXIAL-FLOW CO2 LASER TUBE

BACKGROUND OF THE INVENTION

1. Field of the Invention

The present invention relates to a power source for an axial-flow $CO_2$ laser tube.

2. Description of the Related Art

Figure 1:
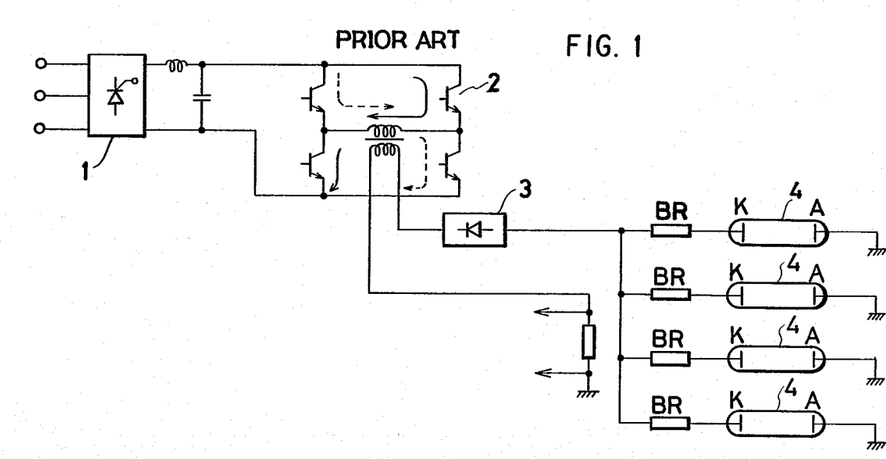
FIG. 1 is a circuit block diagram of a laser power circuit for a conventional DC - DC converter system.

Generally, in a power source for a solid state axial-flow laser tube, a device is desired in which high speed response, and high speed leading and trailing edges are possible. Accordingly, many types of formats have been proposed for conventional power devices. For example, the power device shown in FIG. 1 is a conventional DC-DC converter system laser power device. Commercial three-phase elctric power passes through a full-wave rectifying circuit 1 and is converted to direct current. A full-bridge form, high frequency inverter 2 is used as a pulsed power source. The output of the inverter is supplied to the cathode K of each of the laser tubes 4 through a double voltage rectifier 3 and a ballast resistance BR.

However, with this configuration, because the inductance of the circuit is large, the leading edge and trailing edge of the pulse are unsatisfactory, giving rise to the problem that the feedback for the constant current control is delayed.

Figure 2:
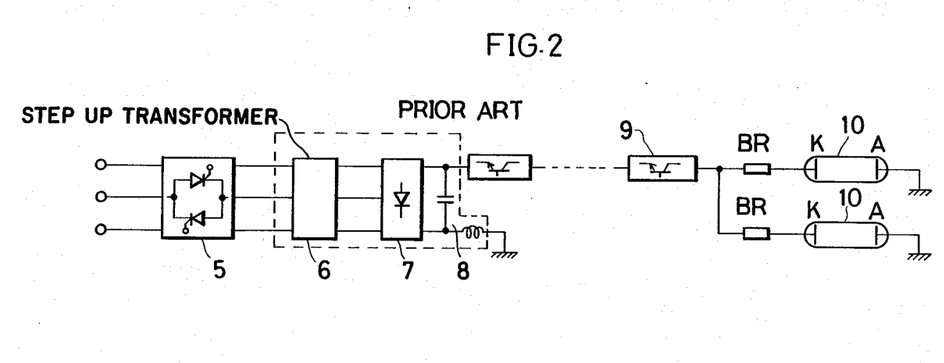
FIG. 2 is a circuit block diagram of a laser power circuit of a conventional direct high voltage switching system.

Accordingly, a laser power circuit with a direct high voltage switching system, as shown in FIG. 2, has also been proposed. In this power circuit, three-phase commercial power is first stabilized by passing through an SCR phase control circuit 5, then is converted to DC current by passing through a step-up transformer 6 and a diode rectification circuit 7, then ripples are eliminated by a ripple filter 8, to obtain DC constant voltage power. The DC constant voltage power obtained is passed through a switching unit 9 to be transformed to a constant voltage pulse power, which is provided to each of the cathodes K of the laser tubes 10, through a ballast resistance BR.

In this circuit, the leading edge and trailing edges of the pulse are satisfactory because the inductance is small, and in addition, even if the number of laser tubes is increased, there is no great change in the power cost. It is more cost effective than other power systems. However, because the circuit impedance is small, the ballast resistance is large, giving rise to the problem that the power consumption of the ballast resistance BR is large. Furthermore, an important point is that when the space between the cathodes K of the laser tubes 10 is smaller than the space between the anodes A and the cathodes K, for reasons which will be later explained, cross discharge is generated, depending on the state of the gas flow. This gives rise to the problem that a drop in laser output is caused, and there are cases where the electric discharge shifts to become an arc discharge.

The reason for the cross discharge is as follows. In the adjacent anode cathode group in one laser tube 10, according to the status of the gas flow, the discharge resistance between the anode and cathode belongnng to the different group is almost identical to the discharge resistance between the anode and cathode within the same group, and discharges occur between the anode of one group and the cathodes of a neighboring group.

SUMMARY OF THE INVENTION

A first object of the present invention is to provide, with due consideration to the drawbacks of such conventional devices, a power device for an axial-flow-type $CO_2$ laser tube wherein the response speed of the power feedback is fast and no cross discharge is produced.

A further object of the present invention is to provide a laser power circuit wherein an SCR phase control circuit can be excluded by means of the use of a pulse width modulating system (PWM) in the switching circuit.

In order to accomplish these objectives, the present invention provides a power device for an axial-flow-type $CO_2$ laser tube wherein a step-up transformer for a three-phase commercial power source is connected to the cathode side of from one to a plurality of laser tubes through a diode rectification circuit, and a switching circuit is connected to the anode side of the laser tubes through a ballast resistance. Accordingly, on the cathode side of each laser tube, a DC voltage is applied, and a pulse voltage is applied to the anode side, becoming the laser output control. For this reason the cathodes become common cathodes, and the generation of cross discharge can be effectively prevented.

BRIEF DESCRIPTION OF THE DRAWINGS

FIGS. 5($a$), 5($b$) are diagrams which show the signals for controlling the high voltage pulse applied to the anodes.

DESCRIPTION OF THE PREFERRED EMBODIMENTS

Figure 3:
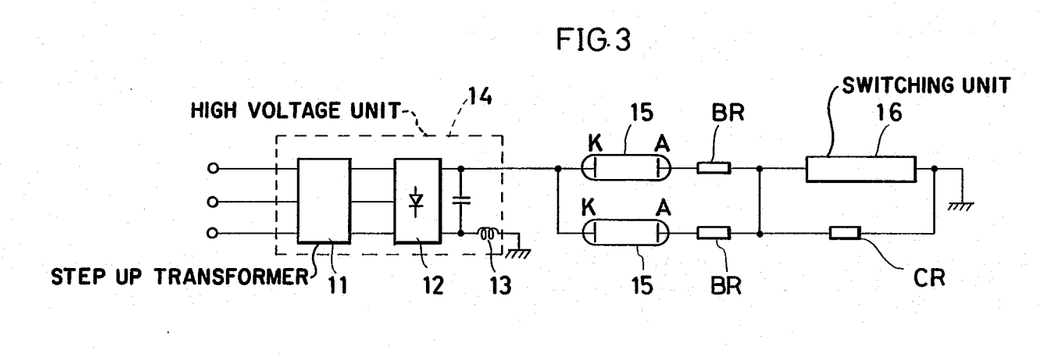
FIG. 3 is a circuit block diagram of one embodiment of the present invention.

FIG. 3 is a circuit block diagram of one embodiment of the present invention wherein a high voltage unit 14 is provided, comprising a step-up transformer 11, a diode rectification circuit 12, and a ripple filter 13, for a three-phase commercial power source, which converts the three-phase commercial power source to a constant voltage DC power source. The output of this high voltage unit 14 is obtained as a constant DC voltage power source for each cathode K of from one to a plurality of laser tubes 15.

A switching unit 16 of a pulse width modulating system (PWM) is connected to an anode A side of each laser tube 15 through a ballast resistance BR. In addition, a simmer resistance CR is connected in parallel with the switching unit 16. The resistance CR is used when a pulse voltage is applied to each ballast resistance BR.

Accordingly, with the laser power circuit of the above configuration, the switching unit 16 provides a pulse power source for the anode A of each laser tube 15 by PWM control. The $CO_2$ gas as a laser medium causes the occurrence of a pulsing glow discharge between the anode A and the cathode K in the laser tube 15, and a laser outpu is obtained. The laser output at this time is controlled by PWM control of the duty ratio of the pulse power source.

Figure 4:
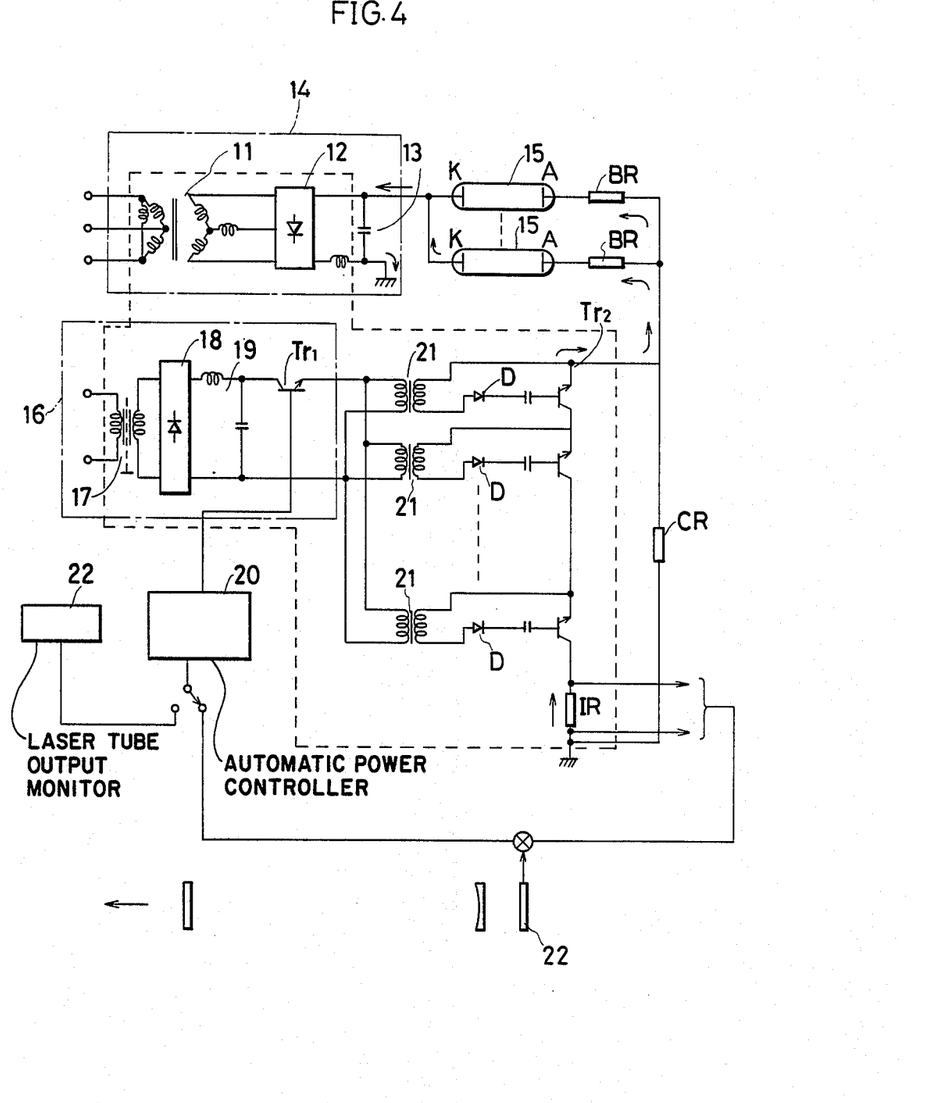
FIG. 4 is a detailed circuit diagram of the same embodiment of the present invention.

FIG. 4 is a more detailed circuit diagram of the laser power circuit of the above configuration. The AC voltage is stabilized by means of the step-up transformer 11 in the high voltage unit 14, then subjected to full wave rectification by means of the diode rectification circuit 12, and smoothed by the ripple filter 13. A constant voltage DC power is thus obtained.

In addition, the switching unit 16 comprises an insulated transformer 17, a diode rectification circuit 18, and a smoothing section 19, and provides a constant voltage DC power for a switching transistor $Tr_1$. The switching output from a conventionally-known automatic power PWM controller 20 is provided for the base of the switching transistor $Tr_1$. The PWM control for the automatic power contrlller 20 feeds back the output current of a high voltage switching section which will be later discussed.

Accordingly, when the switching transistor $Tr_1$ is providing switching control by meass of the automatic power controller 20, the output of the transistor $Tr_1$ becomes a pulse signal and is provided to the pulse transformer 21.

This switching output is stepped up in the pulse transformer 21, rectified in a rectifier D, and provided to the base of a high voltage switching transistor $Tr_2$ as a pulse power source. The high voltage switching transistor $Tr_2$ for a pulse power source outputs a high voltage pulse currnt according to the voltage received at the base. This current is provided to the anode A of each laserttube through the ballast resistance BR.

A simmer resistance CR is connected in parlllel with the output section of the high voltage switching transistor $Tr_2$ and is structured so that a simmer voltage is applied to the anode A. Also, a current monitoring resistance IR is connected to the output of the high voltage switching transistor $Tr_2$, and the voltage at both ends of this monitoring resistance IR is fed back for PWM control of the automatic power controller 20. An output signal is provided to the feedback line by means of a laser tube output monitor 22.

Figures 5A, 5B:
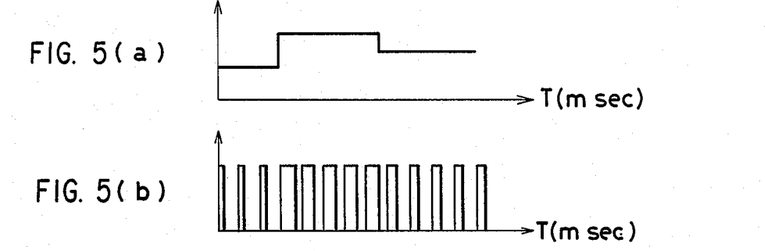

With a laser power circuit of the above configuration, in the automatic power controller 20, first, both end voltages of the current monitor resistance IR, or the laser monitor voltage of the output monitor 22, is compared with the voltage of a power setting device 23, and when this differential signal varies as shown in FIG. 5(a), the pulse width of the switching signal is modulated corresponding to the differential signal as indicated in FIG. 5(b). Then, if this pulse width expands, the time to pass through the switching transistor $TR_1$ and the high voltage switching transistor $TR_2$ is controlled, and this pass-through time lengthens or shortens according to the variation in the pulse width. The duty ratio of the output pulse varies at the same time, and the glow discharge time in the laser tube 15 is also controlled, thus controlling the laser output.

Figure 7:
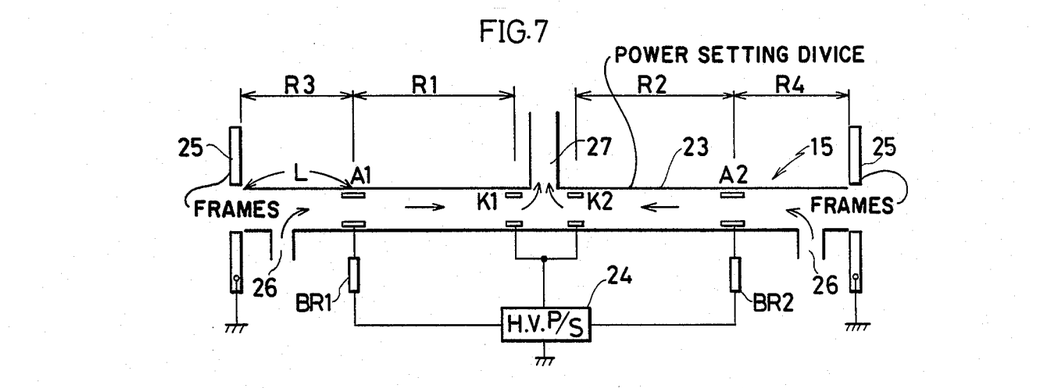
FIG. 7 is a sectional drawing of the laser tube of the above mentioned embodiment of the present invention.

With the laser tube power device of the present invention having the type of action so described, the physical configuration of the laser tube 15 is as shown in FIG. 7. Specifically, one of the anodes A1, A2 of the plurality of laser tubes 15 is positioned at each end in the axial direction of one laser shell 23, and the cathodes K1 and K2 are positioned at each side of the middle section in the axial direction. Then, both sides of the anodes A1 and A2, are connected to the high voltage pulse power supply of the power device 24 through the ballast resistances BR1 and BR2, and the inside cathodes K1 and K2 are connected to the high voltage pulse power supply of the power device 24 as common cathodes. In addition, each frame of a plurality of frames 25 which support each end section of the laser shell 23 in the longitudinal direction is grounded, and a sufficient distance L between each of these frames 25 and each side of the anodes A1 and A2 is provided so that a discharge does not occur. The $CO_2$ as a laser medium is fed into an inlet port 26 close to each end in the longitudinal direction of the laser shell 23, and is led out of an outlet port 27 in the middle section. Accordingly, when a high voltage pulse is applied between each of the assemblies of anode A1—cathode K1, and anode A2— cathode K2, a glow discharge is produced in these apertures, and a laser output can be obtained.

Figure 6:
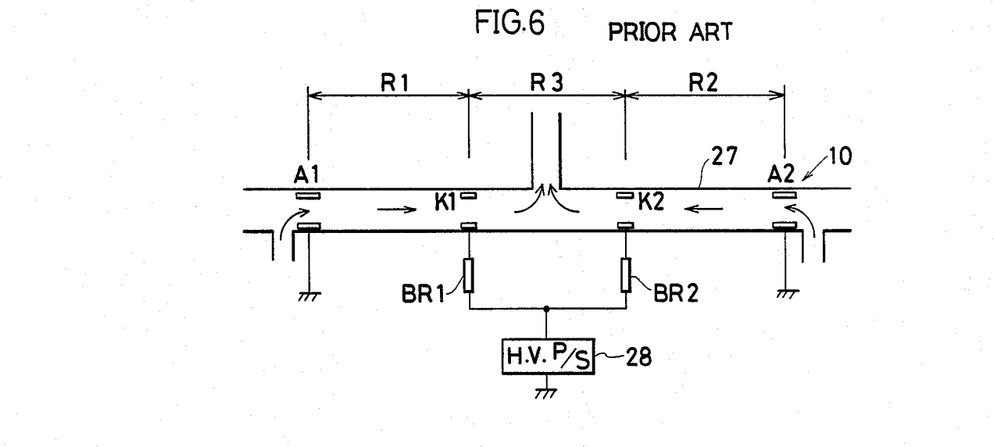
FIG. 6 is a sectional drawing of a laser tube showing the cause of the generation of cross discharge in a conventional system.

However, in the case of a conventional power device for a laser tube, the laser tube 10 is provided with a physical configuration as indicated in FIG. 6. Accordingly, the anodes A1, A2 are positioned at each end in the longitudinal direction of the laser shell 27, the cathodes K1, K2 are positioned at each side in the middle section, the anodes A1, A2 sides are grounded, and the cathodes K1, K2 are connected to the high voltage pulse power of the power device 28 through the ballast resistances BR1, BR2. Therefore, as the power applied to the discharge section increases, the gas impedance decreases, and the gas impedance between the cathodes K1, K2 decreases. Then, the discharge resistance R1 between one anode A1—cathode K1 assembly and the discharge resistance R2 +R3 between the other anode A1—cathode K1 assembly instantaneously attain an almost identical value. Therefore, a discharge should take place essentially between the anode A2 and the cathode K2 of the same assembly. However, a discharge occurs between the anode A2 of one assembly and the cathode K1 of the other assembly, as if an unstable cross-discharge is produced like a discharge between the cathodes K1, K2. Then, in this type of cross-discharge state, the gas impedance between oneoof the anode A1—cathode K1 assemblies increases, and a discharge voltage less than the maintenance voltage is generated, so that the discharge between the electrodes A1, K1 is halted. At this time, the current between the anode A2 and the cathode K2 become a superposition of currents due to the cross-discharge and the normal discharge between the anode A2 and cathode K2. The gas between the anode A2 and the cahtode K2 is abnormally heated, the laser output is decreased, and the discharge also shifts to an arc discharge.

However, in the case of this embodiment of the present invention, because the cathodes K1 and K2 are common cathodes, this type of cross-discharge will not occur and a stable laser output can always be obtained. In addition, as shown in FIG. 7, the frame 25 and the anodes A1 and A2 on both its sides are separated by distance L such that no discharge takes place therebetween so that, even if a $CO_2$ gas medium is introduced into the laser shell 23, it is possible to provide the gas inlet 26 in the section of length L, and make the gas channel long. The rectification of the gas in the laser shell 23 is effectively carried out, providing an even greater stabilization of the laser output.

Figure 8:
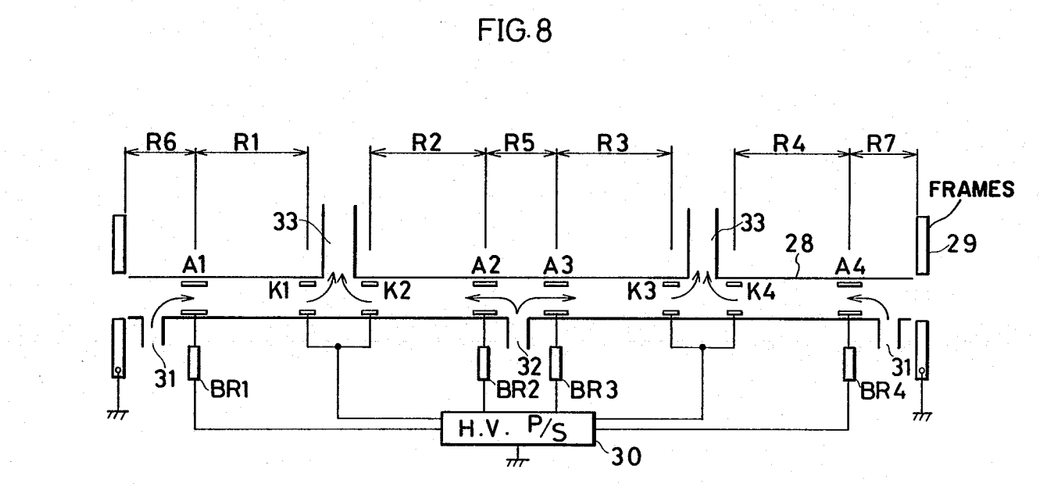
FIG. 8 is a sectional drawing of an embodiment of the laser tube of the present invention in which the number of laser tubes is increased to four.

FIG. 8 gives another embodiment of the present invention, and shows a physical configuration in which the number of laser tubes 15 is increased to four. Specifically, a long laser shell 28 is supported at both ends in the longitudinal direction by a frame 29 which is grounded. The anodes A1 and A4 are respectively positioned at the two ends of the laser shell 28. In addition, an anode A2 and an anode A3 are posttioned at the middle section on both sides in the longitudinal direction. Each group of cathodes K1 and K2 is positioned at the middle section of the anodes A1, A2. In the same way, each group of cathodes K3 and K4 is positioned at the middle section of the anodes A3, A4. Each anode is connected to the high voltage pulse power of the power device 30, through the balance resistances BR1, BR2, BR3, and BR4, and each of the cathodes K1, K2, K3 and K4 and respectively connected directly to the high voltage power of the power device 30. A gas inlet 31 is provided at each end in order to circulate the $CO_2$ through the laser shell 28. A gas inlet 32 is also provided in the middle section in the longitudinal direction. A gas outlet 33 is provided between the cathodes K1 and K2, and another gas outlet 33 provided between the cathodes K3 and K4. In the case where four sets of anodes and cathodes are provided in the long laser shell 28, the balance resistances BR1 to BR4 are provided on the anode side, and the $CO_2$ gas is fed into the laser shell 28 from the gas inlets 31 and 32 on the anode side, so that the gas temperature is comparatively low in the anode section, and even during the laser output operation, the gas impedance R5 to R7 between the anode and the frame, and between the anodes, as shown in FIG. 8, does not change appreciably. Even if the gas impedance R1 to R4 between the anode - cathode groups changes, no cross-discharge is produced, and a stable discharge can be realised.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A power device for an axial-flow-type $CO_2$ laser shell comprising:
   a high voltage DC power source directly connected to a cathode of said laser shell, in which a discharge for laser pumping takes place, for applying a constant high DC voltage to said cathode; and a high voltage pulse power source connected through a ballast resistance to an anode of said laser shell for applying a high pulsed voltage to said aode, said high voltage pulse power source having
   a DC power circuit,
   a switching element having a first terminal to receive a command signal instructing switching operation, and second and third terminals connected or disconnected by said switching operation,
   said second terminal being connectd to said DC power circuit and said third terminal being connected to said anode of said laser shell through ballast resistance, and
   a PWM controller having an output terminal connected to said first terminal of said switching element, for outputting a pulsed voltage with a predetermined repetition frequency and width, as said command signal.

2. The power device of claim 1, wherein said switching element comprises a switching transistor, and said first, second and third terminals of said switching element comprise a base, a collector and an emitter of said switching transistor.

3. The power device of claim 2, wherein said high voltage pulse power source further comprises a pulse transformer having two input terminals, one of said input terminals being connected to said emitter of said switching transistor and said other thereof being grounded, and a high voltage switching transistor, the output terminals of said pulse transformer being connected to a base and an emitter of said high voltage switching transistor, said emitter of said high voltage switching transistor being connected through a ballast resistance to said anode of said laser shell, and said collector of said high voltage switching transistor being grounded.

4. The power device of claim 1, wherein said high voltage DC power source comprises:
   a step-up transformer for boosting a commercially available three-phase voltage and outputting a boosted three-phase voltage;
   a full wave rectifying means connected to said step-up transformer, for rectifying said boosted three-phase voltage and outputting a rectified voltage; and
   a ripple filtering means connected to said full wave rectifying means, for smoothing said rectified voltage and out-putting a substantially constant DC voltage, said ripple filtering means having an output terminal connected to said cathode of said laser shell.

5. The power device for an axial-flow type $CO_2$ laser shell of claim 1, further comprising addttional cathodes connected to said high voltage DC power source and additional anodes connected to said high voltage pulse power source through a ballast resistance, wherein both ends of said laser shell in said longitudinal direction thereof are supported and grounded by frames, said anodes are positioned at some distance from these frames in an internal section at both ends of said laser shell in said longitudinal direction, said some distance being a distance that is sufficiently long to prevent discharge from occurring between aid anodes and said frames, said cathodes are positioned in a middle section of said laser shell in said longitudinal direction, a gas inlet port is provided at a position in a center section between said anodes, and a gas outlet port is provided between said cathodes.

6. The power device for an axial-flow-type $CO_2$ laser shell of claim 1, further comprising additional cathodes connected to said high voltage DC power source and additional anodes connected to said high voltage pulse power sources through respective balast resistances, wherein both ends of said laser shell in said longitudinal direction thereof are supported and grounded by frames, a first pair of said anodes are positioned at some distance from these frames in an internal section at both ends of said laser shell in said longitudinal direction, said some distance being a sufficiently long distance to prevent a discharge from occuring between said first pair of said anodes and said frames, a second pair of said anodes are positioned in a middle section of said laser shell in said longitudinal direction, and said cathodes are paired with said anodes and are respectively positioned in a middle position between said second pair of said anodes and one of said first anodes and gas inlet ports are provided at a position between said anodes and frames, and gas inlet ports are provided at a position between said cathodes.

7. The power device of claim 1, further comprising a simmer resistance connected to said anode at one end thereof and grounded at said other end thereof.

8. The power device of claim 2, wherein said high voltage pulse power source inputs the output from a single phase, constant voltage, DC power circuit to a switching transistor, the PWM control output is provided to the base of said switching transistor, and the pulse output of said switching transistor is amplified by an output transistor.

9. The power device of claim 2, wherein said high voltage pulse power source comprises:
 a step-up transformer for boosting a commercially available three-phase voltage and outputting a boosted three-phase voltage;
 a full wave rectifying means connected to said step-up transformer, for rectifying said boosted three-phase voltage and outputting a rectified voltage; and
 a ripple filtering means connected to said full wave rectifying means, for smoothing said rectified voltage and out-putting a substantially constant DC voltage, said ripple filtering means having an output terminal to be connected to said cathode of said laser shell.

10. The power device for an axial-flow-type $CO_2$ laser tube of claim 3, wherein said high voltage pulse power source comprises:
 a step-up transformer for boosting a cmmmerically available three-phase voltage and outputting a boosted three-phase voltage;
 a full wave rectifying means connected to said step-up transformer, for rectifying said boosted three-phase voltage and outputting a rectified voltage; and
 a ripple filtering means connected to said full wave rectifying means, for smoothing said rectified voltage and out-putting a substantially constant DC voltage, said ripple filtering means having an output terminal to be connected to said cathode of said laser shell.

11. The power device for an axial-flow-type $CO_2$ laser tube of claim 2, wherein both ends of the laser tube in the longitudinal direction of a laser shell are supported and grounded by frames, first anodes are positioned at some distance from these frames in an internal section at both ends of the laser shell in the longitudinal direction, cathodes are positioned in a middle section of the laser shell in the longitudinal direction, inlet ports are provided at a position in a center section between said first anodes and frames at each side of the laser shell, and a gas outlet port is provided between said cathodes.

12. The power device for an axial-flow-type $CO_2$ laser tube of claim 3, wherein both ends of the laser tube in the longitudinal direction of the laser shell are supported and grounded by a frame, and anode is positioned at some distance from these frames in the internal section at both ends of the laser shell in the longitudinal direction, a cathode is positioned in the middle section in the longitudinal direction, a gas inlet port is provided at a position in the center section between the anode and the frames at each side of the laser shell, and gas outlet ports are provided between the two cathodes.

13. The power device for an axial-flow-type $CO_2$ laser tube of claim 4, wherein both ends of the laser tube in the longitudinal direction of a laser shell are supported and grounded by frames, an anode is positioned at some distance from one frame in the internal section of the laser shell in the longitudinal direction, a cathode is positioned in a middle section in the longitudinal direction in the laser shell, a gas inlet port is provided at a middle position between the anode and one frame at each side of the laser shell, and gas outlet port is provided adjacent the cathode.

14. The power device for an axial-flow-type $CO_2$ laser tube of claim 2, wherein both ends of the laser tube in the longitudinal direction of a laser shell are supported and grounded by frames, first anodes are positioned at some distance from these frames in the internal section at both ends of the laser shell in the longitudinal direction, second anodes are positioned in a middle section of the laser shell in the longitudinal direction, and cathodes are paired with said anodes and are respectively positioned in a middle position between said second anodes and one of said first anodes, gas inlet oorts are provided at a position between said first anodes and frames, and gas outlet ports are provided in a middle position between said cathodes.

15. The power device for an axial-flow-type $CO_2$ laser tube of claim 3, wherein both ends of the laser tube in the longitudinal direction of a laser shell are supported and grounded by frames, first anodes are positioned at some distance from these frames in the internal section at both ends of the laser shell in the longitudinal direction, second anodes are positioned in a middle section of the laser shell in the longitudinal direction, cathodes are paired with said anodes and are respectively positioned in a middle position between said second anodes and one of said first anodes, gas inlet ports are provided at a position between said first anodes and frames, and gas outlet ports are provided in a middle position between said cathodes.

16. The power device for an axial-flow-type $CO_2$ laser tube of claim 4, wherein both ends of the laser tube in the longitudinal direction of a laser shell are supported and grounded by frames, first anodes are positioned at some distance from these frames in the internal section at both ends of the laser shell in the longitudinal direction, second anodes are positioned in a middle section of the laser shell in the longitudinal direction, and cathodes are paired with said anodes and are respectively positioned in a middle position between said second anodes, and gas outlet ports are provided in a middle position between said cathodes.

17. The power device of claim 2, further comprisng a simmer resistance connected to said anode at one end thereof and grounded at said other end thereof.

18. The power device of claim 3, further comprising a simmer resistance connected to said anode at one end thereof and grounded at said other end thereof.

19. The power device of claim 4, further comprising a simmer resistance connected to said anode at one end thereof and grounded at said other end thereof.

20. The power device of claim 1, further comprising means for monitoring a discharge current flow supplied between said anode and said cathoee, and outputting a feed back signal correspoting to a quantity of said discharge current flow to an input terminal of said PWM controller which modulates at least one of said repetition frequency and said width of said command signal, in response to said feedback signal.

* * * * *

UNITED STATES PATENT AND TRADEMARK OFFICE
CERTIFICATE OF CORRECTION

PATENT NO. : 4,794,603

DATED : December 27, 1988

INVENTOR(S) : RYOJI KOSEKI

It is certified that error appears in the above-identified patent and that said Letters Patent is hereby corrected as shown below:

FRONT PAGE:

Assignee: "Amanda" should be --Amada--.

IN THE SPECIFICATION:

Column 1, line 64, "belongnng" should be --belonging--;

Column 3, line 7, "outpu" should be --output--;
　　　　　line 24, "contrlller" should be --controller--;
　　　　　line 28, "meass" should be --means--;
　　　　　line 37, "currnt" should be --current--;
　　　　　line 39, "laserttube" should be --laser tube--;
　　　　　line 40, "parlllel" should be --parallel--;

Column 4, line 47, "oneoof" should be --one of--;

Column 5, line 10, "posttioned" should be --positioned--.

UNITED STATES PATENT AND TRADEMARK OFFICE
CERTIFICATE OF CORRECTION

PATENT NO. : 4,794,603

DATED : December 27, 1988

INVENTOR(S) : RYOJI KOSEKI

It is certified that error appears in the above-identified patent and that said Letters Patent is hereby corrected as shown below:

IN THE CLAIMS:

Claim 1, line 4, after "of" insert --a--.

Claim 2, line 1, "claim 1," should be --claim 20,--.

Claim 4, line 1, "claim 1," should be --claim 20,--.

Claim 5, line 2, "claim 1," should be --claim 20,--.

Claim 6, line 2, "claim 1," should be --claim 20,--.

Claim 10, line 4, "cmmmerically" should be --commercially--.

Claim 11, line 8, after "direction," insert --gas--.

UNITED STATES PATENT AND TRADEMARK OFFICE
CERTIFICATE OF CORRECTION

PATENT NO. : 4,794,603

DATED : December 27, 1988

INVENTOR(S) : RYOJI KOSEKI

It is certified that error appears in the above-identified patent and that said Letters Patent is hereby corrected as shown below:

Claim 13, line 5, "the" should be --an--;
         line 10, after "and" insert --a--.

Claim 14, line 5, "the" should be --an--;
         line 12, "oorts" should be --ports--.

Claim 15, line 5, "the" should be --an--.

Claim 16, line 5, "the" should be --an--.
         line 11, after "anodes" insert --and one of said first anodes, gas inlet ports are provided at a position between said first anodes and frames--.

Claim 20, line 3, "cathoee," should be --cathode,--.

Signed and Sealed this

Eighth Day of August, 1989

Attest:

DONALD J. QUIGG

Attesting Officer

Commissioner of Patents and Trademarks